United States Patent [19]

Svensson

[11] Patent Number: 4,773,698

[45] Date of Patent: Sep. 27, 1988

[54] AXLE ATTACHMENT FOR SUN VISOR ASSEMBLIES

[75] Inventor: E. Gunnar Svensson, Malung, Sweden

[73] Assignee: Autopart Sweden AB, Malung, Sweden

[21] Appl. No.: 13,874

[22] Filed: Feb. 12, 1987

[30] Foreign Application Priority Data

Mar. 7, 1986 [SE] Sweden .................. 8601066

[51] Int. Cl.⁴ .............................. B60J 3/02
[52] U.S. Cl. .................................. 296/97.9
[58] Field of Search ............. 296/97 R, 97 H, 97 K

[56] References Cited

U.S. PATENT DOCUMENTS

| | | | |
|---|---|---|---|
| 3,193,323 | 7/1965 | Herr et al. | 296/97 H |
| 4,494,789 | 1/1985 | Flowerday | 296/97 H |
| 4,664,435 | 10/1987 | Dietz et al. | 296/97 H |
| 4,668,005 | 5/1987 | Dietz | 296/97 H |

FOREIGN PATENT DOCUMENTS

| | | | |
|---|---|---|---|
| 0125388 | 11/1984 | European Pat. Off. | 296/97 K |
| 0129793 | 1/1985 | European Pat. Off. | |
| 2226429 | 12/1973 | Fed. Rep. of Germany | 296/97 K |
| 0199447 | 11/1965 | Sweden . | |
| 1089754 | 11/1967 | United Kingdom | 296/97 K |

*Primary Examiner*—Dennis H. Pedder
*Attorney, Agent, or Firm*—Young & Thompson

[57] ABSTRACT

An axle attachment for a sun visor assembly, or a dazzle shield assembly, intended for automotive vehicles, the sun visor of the assembly having a U-shaped recess provided in its upper edge for accommodating an axle that is capable of being detached manually from axle bearings provided in the ceiling of the vehicle. The axle is formed integrally with a U-shaped attachment fitting, the axle being located between the limbs of the attachment fitting. The sides of the attachment fitting facing the recess in the visor have a shape which is complementary with the shape of the recess edge surfaces, such that the side surfaces of the attachment fitting will embrace the recess edges substantially over the whole width thereof in a saddle-like manner. The attachment fitting is firmly connected to the sun visor. The resulting attachment can be fitted in one single rectilinear movement.

9 Claims, 3 Drawing Sheets

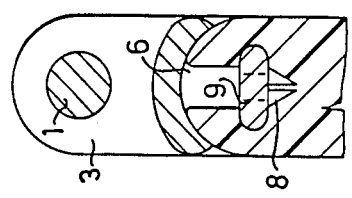
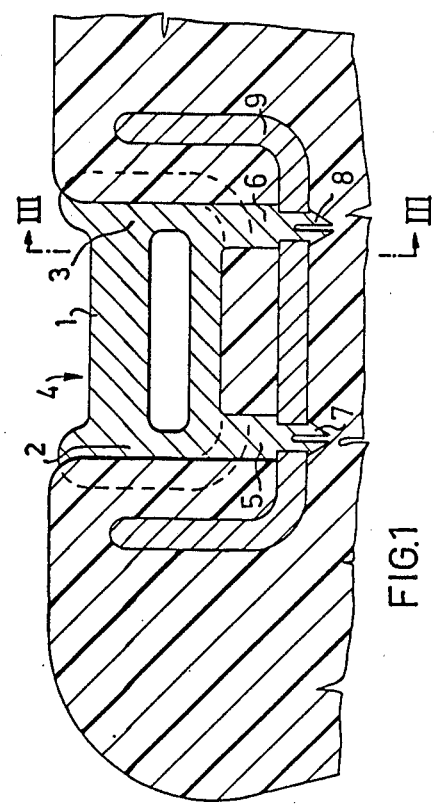
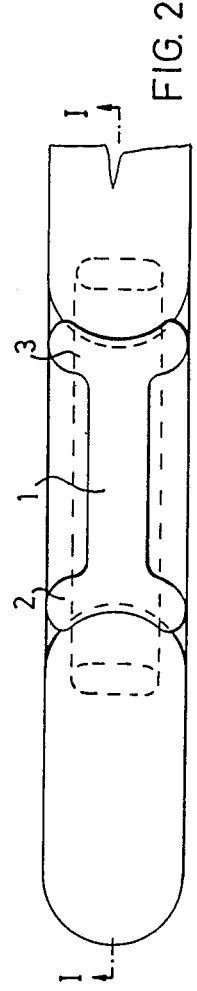

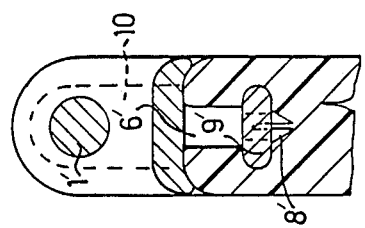
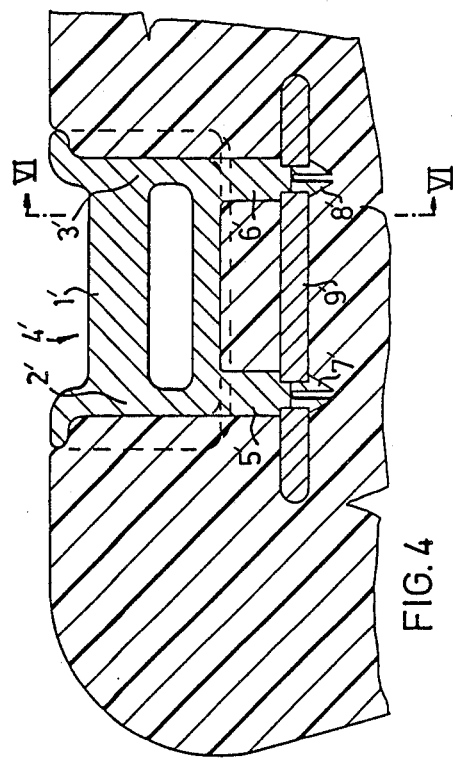
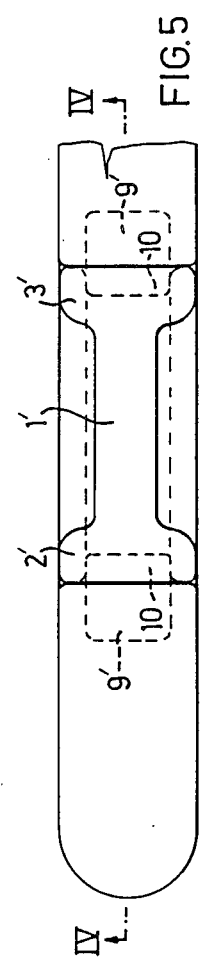

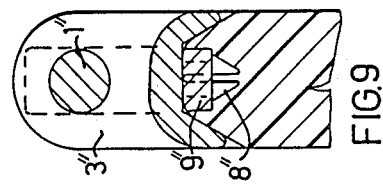
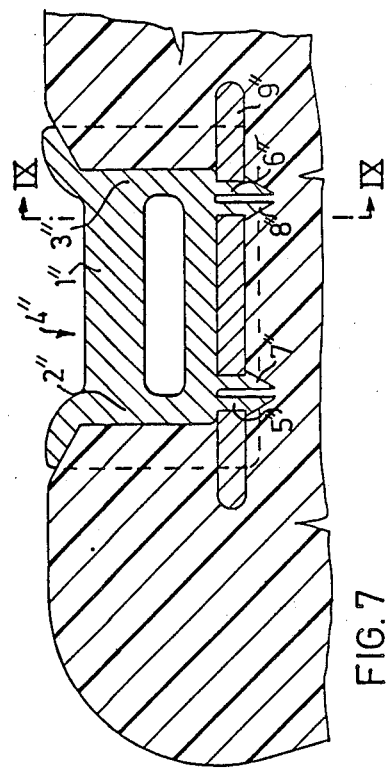
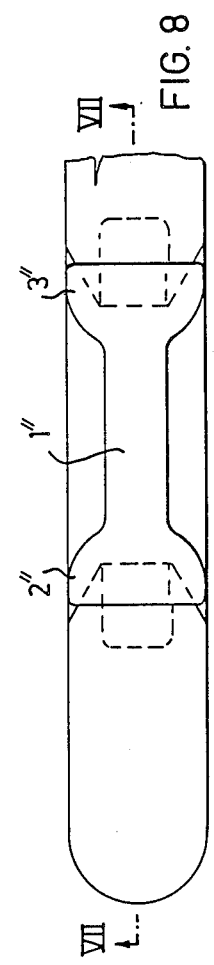

AXLE ATTACHMENT FOR SUN VISOR ASSEMBLIES

The present invention relates to an axle attachment for embodiment in a sun visor assembly of the kind intended for an automotive vehicle, the sun visor, or glare shield, of said assembly having provided in the upper surface thereof a U-shaped recess which is intended to accommodate an axle, or like pivot device, that can be detached manually from axle bearings mounted on the ceiling of the vehicle.

When fitting such axles in accordance with conventional fitting procedures, the axle is inserted into bearing sockets molded in the visor, on the mutually opposing side surfaces of the U-shaped recess located therein. Although this axle functions satisfactorily per se, it has certain drawbacks from a manufacturing aspect and from the aspect of fitting the axle in position in the assembly.

When fitting the axle in the bearing sockets, which is done in the final stage of manufacturing a sun visor assembly, it is necessary to insert first one end of the axle obliquely in one bearing socket, and then to push the axle axially beyond its terminal position in the bearing socket, in order to be able to insert the other end of the axle in the other, opposing bearing socket. The task of fitting the axle is thus relatively complicated. The axle is pointed at the ends thereof, so as to enable the axle to penetrate the plastic covering surrounding the sun visor, or dazzle shield, of the assembly, in the vicinity of the bearing sockets. This requires a relatively high degree of accuracy on the part of the fitter concerned, if the plastic covering is not to be damaged when inserting the axle into the bearing sockets. If the plastic covering is damaged, e.g. torn or apertured in some way, the whole assembly must be scrapped. The object of the present invention is to eliminate these drawbacks. This object is achieved in accordance with the invention by providing a sun visor assembly of the aforesaid kind that has the characteristic features set forth below.

The procedure of fitting an axle attachment to a sun visor is simplified considerably in this way, partly because the axle attachment can be fitted in a single, rectilinear movement, and partly because less precision is required during a fitting operation, due to the fact that the outer surfaces of the attachment fitting are guided by the edges of the accommodating recess in the visor. In addition, the risk of unintentional damage to the covering when fitting the axle attachment is eliminated. Furthermore, the attachment fitting hides the edge surfaces of the recess, and consequently a fold in the covering material or the presence of defects in the welding joints along the recess edge surfaces no longer warrants the rejection of a sun visor assembly. This is an important advantage, since the recess portion of the visor is that part of the visor in which such defects most often occur.

These and other advantages afforded by the invention will become more apparent from the following detailed description of embodiments of a sun visor assembly according to the invention, made with reference to the accompanying drawings, in which FIG. 1 is a sectioned view of part of a sun visor assembly provided with a first embodiment of an axle attachment according to the invention;

FIG. 2 is a top plan view of the sun visor assembly illustrated in FIG. 1;

FIG. 3 is a sectional view taken on the line III—III in FIG. 1;

FIGS. 4–6 are views that correspond with the views of FIGS. 1–3 and illustrate a second embodiment of an axle attachment according to the invention, and FIGS. 7–9 are views that correspond to the views of FIGS. 1–3 and illustrate a third embodiment of an axle attachment according to the invention.

In the embodiment illustrated in FIGS. 1–3 the axle attachment according to the invention is adapted for use with a conventional sun visor, or dazzle shield, having rounded edge surfaces, thereby enabling the sun visor, or dazzle shield, to be manufactured in a conventional manner. The axle 1, which is intended to be removeably attached to axle bearings or journals firmly mounted on the ceiling of the vehicle, is firmly connected to the limbs 2, 3 of a U-shaped attachment fitting 4 of resilient material. For manufacturing reasons and reasons of an aesthetic nature, the axle 1 is preferably formed in one piece, i.e. integrally, with the attachment fitting 4. Furthermore, the sides of the attachment fitting that face the recess have a shape which is complementary to the edge surfaces of the recess, i.e. have a concavity which is equally as large as the convexity presented by the edge surfaces of the recess, as will best be seen from FIGS. 2 and 3.

Extending from the under-surface of the attachment fitting are two pegs 5,6 which terminate in locking tongues 7,8. The locking tongues co-act with apertures located in a locking element 9 mounted on the sun visor. The locking element can be held in position, e.g. in an embedment, in any suitable manner, for example by connection with the so-called sun-visor binder or stiffener, which binder may comprise a metal wire that extends around the sun visor and conforms to the contours thereof. The locking element of the embodiment illustrated in FIGS. 1–3 has a U-shaped configuration and extends around the recess at a distance from the edge surfaces thereof in mutually parallel spaced relation with the sides and bottom of the recess, thereby to stiffen the sun visor in the region of the periphery of the recess. It will be understood that the attachment fitting can be provided with any desired number of pegs.

The axle attachment is fitted in position by inserting the attachment fitting linearly into the recess. This linear movement of the attachment fitting need not be carried out with any great degree of accuracy, since the outwardly facing side surfaces of the attachment fitting are formed to co-act guidingly with the side edges of the recess. The locking element, on the other hand, should be located at a distance from the bottom of the recess such that the axial extensions of the pegs, including the locking tongues, falls short of the vertical extension of the recess, i.e. so that the attachment fitting is guided into place before the locking tongues enter the sun visor at the bottom of the recess. In the shown embodiments it is assumed that the combination of materials and the forces required for introducing the attachment fitting are such that allow the pegs to penetrate into the visor and into the apertures of the locking element without difficulty. In order to reduce the force required to insert the axle attachment into position in the sun visor assembly, the sun visor may be provided with hole-forming studs during a stage of its manufacture, such as to provide holes in the sun visor in connection with the apertures in the locking element.

The inventive construction of the axle attachment according to the invention affords particularly stable retention of the axle 1, partly through the locking effect achieved by the locking element and partly through the complementary configurations of the attachment fitting and the edge surfaces of the recess.

It will thus be appreciated that the U-shaped recess in which fitting 4 is received has edge surfaces that extend from the upper edge surface of the visor perpendicular to that upper edge surface, and that the depth of these edge surfaces of the recess relative to that upper edge is so related to the extension length of pegs 5, 6 from the attachment fitting that upon insertion of the locking tongues 7, 8 of the pegs into the apertures in locking element 9, the tongues will enter the apertures only after the sides of attachment fitting 4 have embraced the mentioned edge surfaces of the recess thereby to guide the locking tongues into the apertures.

The embodiment of the axle attachment shown in FIGS. 4-6 differs from the embodiment illustrated in FIGS. 1-3, in that instead of being rounded in a conventional manner, the side edges of the recess are provided with a central, outwardly protruding rib 10 of rectangular cross-section, as shown in broken lines in FIG. 5, and the bottom of the recess is essentially flat, as shown in FIG. 6. Naturally, the shape of the complementary outer sides of the attachment fitting will also differ commensurately, so that these sides seat uniformly around the defining edges of the recess. In FIGS. 4-6, the parts similar to those of FIGS. 1-3 have reference numerals that are the same but are primed.

FIGS. 7-8 illustrate a third embodiment of the axle attachment according to the invention. In the case of this embodiment the cross-sectional shape of the complementary surfaces of the recess and attachment fitting is that of a truncated triangle. Furthermore, the locking element 9 is positioned so that its upper side surface lies flush with the upper surface of the sun visor along the bottom of the recess. In FIGS. 7-9, the parts similar to those of FIGS. 1-6 have reference numerals that are the same but are double-primed.

This embodiment is particularly suitable when desiring an axle fitting procedure which requires the application of only a slight insertion force.

Although, of course, it is conceivable to place the locking apertures in the attachment fitting and the locking pegs on the locking element, the embodiment in which the locking apertures are situated in the locking element is to be preferred for aesthetic and practical reasons (otherwise, inter alia, the mold used to produce the sun visor and its binder becomes more complicated).

According to one conceivable alternative, the snap-coupling arrangement incorporating the locking tongues and apertures can be replaced with an adhesive joint between the attachment fitting and the sun visor. In this case it is necessary to remove a part of the cover material from the region of the edge surfaces of the recess, either prior to or subsequent to joining the two cover portions together around the edges of the sun visor, these cover portions together forming the outer covering of the sun visor.

When an adhesive joint is used, it shall be ensured, however, that the part of the outer surfaces of the attachment fitting which are not bonded to the sun visor by the adhesive joint extend over the non-connected sides of the outer covering with a good margin. These parts of the attachment fitting may be bonded firmly to the sides of the covering.

Thus, there is provided by the invention an axle attachment with a non-rotatable axle, this attachment being particularly stable in all directions in which loads are applied. The axle attachment can also be fitted with considerable ease, and fitting of the axle is well suited for automation. In addition hereto, there is no risk of damage to the outer covering of the visor when fitting the axle attachment, which results in a commensurate decrease in the number of sun visor assemblies which need to be scrapped. Another advantage is that the outer surfaces of the attachment fitting will hide any defects that may be present in the visor covering at the edges of the recess, thereby further reducing the number of visors that need be scrapped.

It will be understood that other modifications can be made to the axle attachment according to the invention without departing from the concept of the invention. For example, the degree of accuracy required when inserting the attachment fitting into the visor recess may be further reduced by bevelling the upper side surfaces of the recess, as indicated in FIG. 7. Consequently, the scope of the invention is limited solely by the scope of the following claims.

I claim:

1. In an axle attachment for sun visor assemblies which are intended for use in automotive vehicles and in which the sun visor has located in the upper edge surface thereof a U-shaped recess having edge surfaces substantially perpendicular to said upper edge surface for accommodating an axle that is capable of being detached manually from axle bearings mounted on the ceiling of the vehicle, the axle being formed integrally with a U-shaped attachment fitting and located between the limbs thereof; the improvement in which the attachment fitting has opposite end sides that face the recess located in the sun visor, said sides having a shape which is complementary to the shape of the edge surfaces of the recess, said sides embracing said recess edge surfaces in a saddle-like manner over substantially the whole of the width of said surfaces, the attachment fitting being connected firmly to the sun visor, the attachment fitting being made of a resilient material and including downwardly extending pegs which terminate at their free ends with respective locking tongues which co-act with apertures provided in a locking element arranged in the sun visor, thereby to achieve said firm connection between the sun visor and the attachment fitting, an extension length of said pegs from said attachment fitting and a depth of said edge surfaces of the recess relative to said upper edge being such that upon insertion of said locking tongues into said apertures, said tongues enter said apertures only after said sides of said attachment fitting have embraced said edge surfaces of the recess thereby to guide said locking tongues into said apertures.

2. An axle attachment according to claim 1, in which the edge surfaces of the recess have a semi-circular cross-sectional shape.

3. An axle attachment according to claim 1, in which the edge surfaces of the recess when seen in cross-section, have the shape of truncated triangles.

4. An axle attachment according to cliam 1, in which the recess edges forming the limbs of the U-shaped recess are provided with a central, outwardly protruding rib.

5. An axle attachment according to claim 1, in which the locking element is fully embedded in the sun visor and extends in mutually parallel spaced relationship with the bottom of the recess.

6. An axle attachment according to claim 1, in which an upper side of the locking element lies flush with the bottom of the recess.

7. An axle attachment according to claim 1, in which the locking element is U-shaped and extends along the recess edge surfaces at a distance therefrom.

8. An axle attachment according to claim 1, in which the locking element is an elongated member embedded in the sun visor at least at the ends of the locking element, said apertures being disposed between said ends of the locking element.

9. An axle attachment according to claim 1, in which said attachment fitting extends substantially no higher than the upper edge of the sun visor.

* * * * *